Patented May 20, 1941

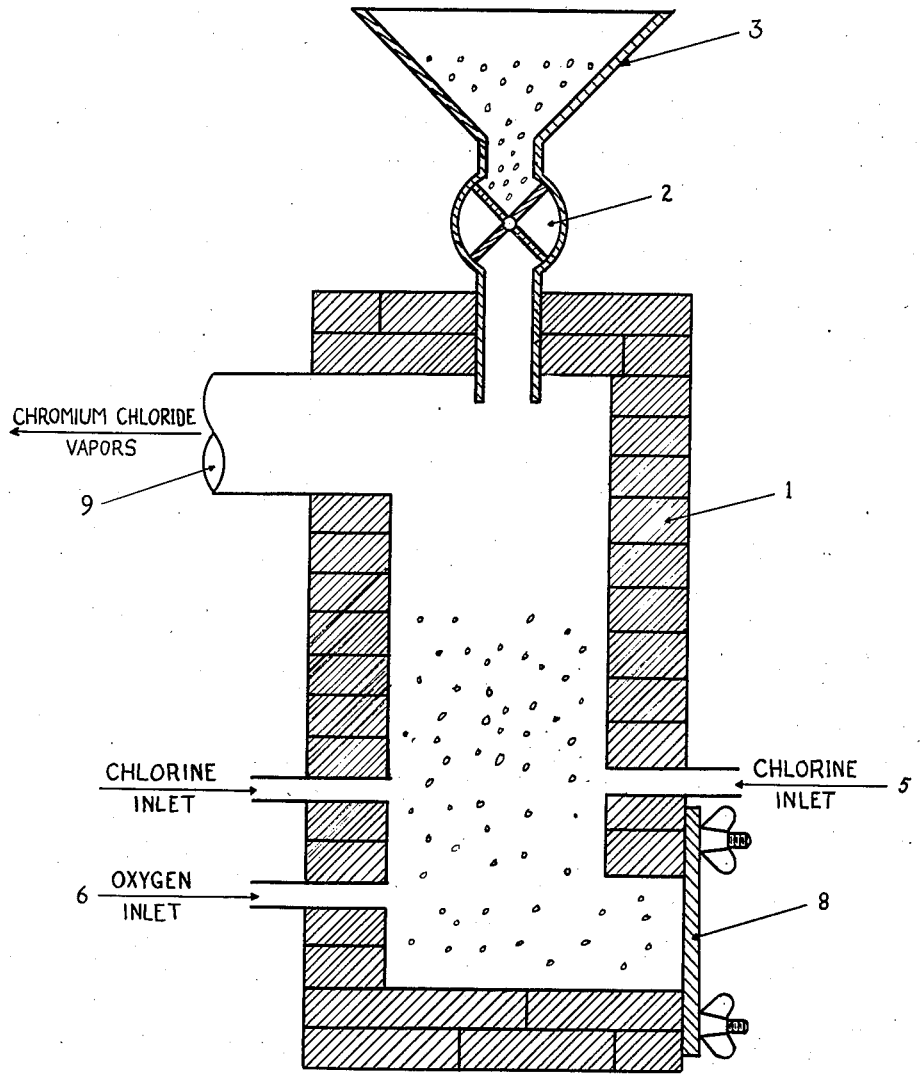

2,242,257

UNITED STATES PATENT OFFICE 2,242,257

CHLORINATION OF CHROMIUM BEARING MATERIALS

Irving E. Muskat, Akron, Ohio, assignor to Pittsburgh Plate Glass Company, Allegheny County, Pa., a corporation of Pennsylvania Application November 30, 1939, Serial No. 306,876

13 Claims. (Cl. 75—112)

This invention relates to the chlorination of chromium containing substances, such as ferro chromium, or chromium ores, for example, chromite ore, and is particularly adapted to the treatment of materials wherein the chromium concentrate is substantial, generally in exces of 10 percent by weight, and preferably in excess of 20 percent. In the chlorination of such ores, it is often found that the ore in the interior of the chlorinating furnace sinters and bridges to such an extent that continued operation becomes extremely difficult, if not impossible. In accordance with my invention, I have found that the plugging or bridging may be prevented, thus permitting continuous or substantially continuous operation by conducting the chlorination at a temperature sufficiently high to insure volatilization of compounds which normally causes sintering or to prevent the formation of such compounds.

I have found that the bridging or plugging is due, in part at least, to the formation of chlorine compounds which soften or melt at the temperatures of treatment but which do not readily volatilize. These softened chlorides, oxychlorides or other chlorine compounds, tend to agglomerate the ore and to form a solid sintered mass in the furnace, thus preventing continuous operation. For example, magnesium and calcium, which are common constituents, in many chromium ores, are converted to compounds containing magnesium or calcium and chlorine, and which soften or melt with consequent plugging of the furnace. Similarly, chromous chloride occasionally forms and melts or softens to an undesirable degree. The plugging may be produced or complicated by other additional factors which as yet have not been determined. I have found, however, that by conducting the chlorination at a sufficiently high temperature, the tendency toward bridging is substantially eliminated and relatively nonvolatile chlorine compounds which normally cause bridging are volatilized.

In general, it is found desirable to chlorinate a mixture of ore and carbon or other suitable reducing agent. The ore may be of any convenient size or form but is preferably ground, for example, to minus one-hundred mesh, and is then mixed with a suitable carbonaceous product, such as coal coke, petroleum coke, charcoal or coal. The mixture may then be treated with chlorine as such or may be preliminarily briquetted prior to chlorination.

If desired, oxygen may be introduced during the chlorination to assist in the reaction and to aid in establishing a high temperature within the furnace. The amount of oxygen used is dependent upon the temperature of treatment and the amount of carbon present and upon the quantity of heat evolved by the chlorination reaction. It is found that by introducing excess quantities of carbon into the furnace the oxygen burns the excess carbon and develops additional heat, thus serving as a simple means for developing high temperatures within the furnace without application of external heat thereto. In addition, it reduces or minimizes the formation of the nonvolatile chlorides which cause bridging as described in a copending application Serial No. 246,838, filed December 20, 1938, by myself and Norman Howard, issued as Patent 2,185,218, dated Jan. 2, 1940. The concentrations of oxygen introduced may be varied in accordance with the amount of excess carbon introduced but it is preferred that the amount of oxygen used should not substantially exceed the amount of chlorine or similar agent since otherwise the chlorine in the furnace will be so diluted that maintenance of the temperature of reaction may be difficult, nor should the oxygen present be in sufficient amounts to prevent entirely the formation of magnesium chloride. Preferably the amount of chlorine should comprise not substantially less than 20 percent of the total gas introduced into the chlorination chamber and the oxygen concentration should not be in excess of the chlorine concentration. The use of pure oxygen is not necessary since air may be introduced into the furnace with excellent results.

The temperature required in order to avoid sintering is dependent upon the concentration of sintering constituents in the ore but, in general, should exceed 1250–1300° C. Where the magnesium content of the ore undergoing treatment is high, temperatures in excess of 1400° C. are found essential. This temperature may be established and maintained by preheating the ore and/or the gases being introduced into the furnace. In many cases, however, the preheating of the ore is unnecessary. Thus, the chlorination of chromite ore may be initiated by passing chlorine and oxygen through a mixture of carbon and ore at a temperature of 800–900° C. By rapid and continued introduction of the ore and chlorine the temperatures of the reaction may be raised to a temperature above 1250° C. after which oxygen introduction may be discontinued, if desired.

The process may be conducted in any convenient apparatus, such as a rotary kiln, a shaft furnace, or a roasting oven. These furnaces may be externally heated if necessary. I have found it convenient to make use of a shaft furnace and, in general, the process may be conducted in the manner described in the copending application Serial No. 246,838, filed Dec. 20, 1938. In accordance with this modification, the process is operated so that the heat of the reaction maintains or assists in maintaining the desired temperature without application of external heat.

The accompanying drawing diagrammatically illustrates a sectional view of a suitable apparatus for conducting the process in accordance with my invention. The apparatus comprises a suitable shaft furnace 1, which may be constructed of firebrick or other refractory, and which is provided with chlorine tuyères 5, oxygen tuyères 6, an ore feed device 2, and an outlet 9, for evolved vapors. In the operation of the device, hopper 3, is filled wih ore and carbon, generally in the form of briquettes which are fed into the furnace at a controlled rate through star feeding device 2. Chlorine and oxygen, if desired, are introduced through tuyères 5 and 6, and the ore is chlorinated. The base of the furnace is provided with a suitable door or other closure 8, at which ash and unchlorinated ore may be withdrawn continuously or intermittently. The iron, chromium, and other chlorides which volatilize are withdrawn through outlet 9, and are condensed by suitable means.

In order to initiate the process, the furnace may be preheated in a convenient manner and when it has been heated to a desired temperature, for example, about 1250° C. or above, an initial charge of ore may be introduced. This charge may consist of a mixture of carbon and briquettes containing carbon and ore and may be preheated to a high temperature, for example, above 1250° C. Sufficient chlorine together with some air or oxygen, if desired, may be introduced to ignite the carbon and to initiate the chlorination reaction. Further charges of briquettes and carbon may be introduced as the reaction proceeds, the rate of addition of oxygen, chlorine, ore and carbon being regulated to maintain the temperature above about 1250° C. and preferably about 1400–1800° C. Where the charge is brought up to temperature partly or entirely by external heating, after such heating is reached, external heating may be discontinued. In many cases it is preferable to preheat the ore, chlorine, and/or oxygen in order to assist in the development of the required temperature.

In order to maintain the process in continuous operation, it is preferred to introduce the ore, carbon, and chlorine and oxygen if desired, at such a rate that the temperature is maintained above 1250° C., preferably at 1400–1600° C. Ordinarily, this may be done by regulating the rate of introduction of carbon-ore mixtures or briquettes and/or additional carbon in accordance with periodic or continuous observation of the temperature in the reactor and by preheating the ore, if necessary. Thus, if the temperature begins to decrease, the rate of introduction of the chlorine and/or air and of the ore-carbon mixture may be increased while if the temperature increases, the rate of ore, carbon and chlorine or air introduction may be decreased. The temperature also may be regulated to some degree by controlling the rate of withdrawal of the chlorinated residue and/or the gaseous products, since a large amount of heat may be dissipated by rapid removal of the residue and/or gases and the reactor cooled by the incoming ore. If desired, a further control of the temperature may be effected by control of the amount of air or oxygen and chlorine which is introduced into the reactor. Thus, for a given amount of carbon in a charge, a small increase in air or oxygen concentration may tend to retard the reaction.

If difficulty is encountered in maintaining the temperature by the heat of the chlorination reaction, carbon lumps may be added to the reaction zone with or without a charge of briquettes and air or oxygen introduced to burn sufficient carbon to raise the temperature to the desired value. In addition, briquettes containing an increased concentration of carbon may be added.

While it is found convenient to utilize oxygen or air in the reaction in order to insure the establishment of the high temperatures utilized, this is not an essential feature of the invention. In many cases, the heat evolved from the chlorination is sufficient to maintain the temperature at the desired level. In other cases, the furnace may be heated externally or the ore may be preheated to a high temperature prior to its introduction into the furnace.

The carbon concentration in the ore-carbon mixture may be varied in accordance with the amount of oxygen introduced into the furnace and the composition of the ore. With high concentrations of air, correspondingly high concentrations of carbon are generally desirable while with lower air concentrations, the carbon concentrations may be lower. The carbon concentration also is governed by the amount of chromium and iron in the ore since with high chromium and iron concentrations, the carbon should be correspondingly high and with lower concentrations of these metals, the carbon required is correspondingly low. Carbon in excess of 10 percent is generally found desirable. In treating chromium ores such as chromite which contain 25 to 55 percent $Cr_2O_3$ for vaporization of both iron and chromium chlorides, it is found that optimum results may be obtained by introducing 20 to 40 percent by weight of carbon based upon the weight of the ore and 5 to 20 percent of oxygen by volume based upon the volume of chlorine introduced. The following example is illustrative:

A quantity of briquettes ¼ to 1 inch in diameter were prepared from a mixture of 100 parts by weight of chromite ore, 12 parts by weight of ground coke, 8 parts by weight of sawdust and 12 parts by weight of molasses, by firing at 500° C. until the volatile hydrocarbons were substantially removed. The carbon content of the briquettes was about 17 percent of the weight of the briquettes. The ore contained 42.6% $Cr_2O_3$, 22% FeO and 12.1% MgO.

A shaft furnace, having an internal diameter of 10 inches was preheated by a coke fire within the shaft at 1300° C. At this time a charge of briquettes preheated to 1300° C. were added and chlorine and oxygen were introduced into the base of the shaft to initiate the chlorination reaction. The process was carried on continuously for many hours by introducing briquettes preheated to 1300° C. at a rate of 0.22 kg. per minute, chlorine preheated to 1000° C. at a rate of 150 liters per minute, and oxygen preheated to 1000° C. at the rate of 10 liters per minute. The temperature remained at about 1400–1500° C. throughout the reaction, and chloride vapors given off were condensed and recovered. No tendency toward bridging within the furnace was noted during the run.

Hydrogen chloride, phosgene, or other gaseous chlorinating agents may be used in conjunction with chlorine or in lieu thereof in accordance with my invention.

The process is not limited to treatment of ores but is applicable to other chromium concentrates particularly those containing magnesium, calcium, or other alkaline earth metals, such as waste alloy compositions, metallic residues, ferrochrome, chrome pigment compositions or other residues containing substantial amounts of this metal. In general, it is preferred to treat materials containing upward of 10 percent chromium and preferably in excess of 20 percent chromium ore.

Although this invention has been described with reference to specific details of certain embodiments thereof, it is not intended that such details shall be regarded as limitations upon the scope of the invention except insofar as included in the accompanying claims.

I claim:

1. A method of chlorinating chromium bearing material containing at least about 10 percent chromium and containing magnesium which comprises chlorinating said material at a temperature sufficiently high to cause volatilization of magnesium chloride.

2. A method of chlorinating chromite ore containing at least about 10 percent chromium which comprises chlorinating a mixture of said ore and carbon at a temperature sufficiently high to cause volatilization of metallic chlorides which tend to cause sintering at lower temperatures.

3. A process of chlorinating a chromium bearing material which comprises countercurrently contacting said material in a moving stream with chlorine to form metallic chlorides including chromium chloride and maintaining the temperature sufficiently high to volatilize chlorides which tend to cause sintering at lower temperatures.

4. A process of chlorinating a chromium bearing material containing magnesium which comprises countercurrently contacting said material in a moving stream with chlorine to form metallic chlorides including chromium chloride and maintaining the temperature sufficiently high to volatilize magnesium chloride.

5. A process of chlorinating a chromite containing magnesium which comprises countercurrently contacting said ore in a moving stream with chlorine to form metallic chlorides including chromium chloride and maintaining the temperature not substantially less than 1400° C. to volatilize magnesium chloride.

6. A method of chlorinating a chromium ore containing magnesium which comprises initiating the reaction between a mixture of said ore and chlorine in the presence of a reducing agent and sufficient oxygen to substantially minimize sintering of the ore, introducing further quantities of ore, chlorine, oxygen and reducing agent until the temperature of the reaction exceeds 1250° C. and thereafter continuing the introduction of ore, reducing agent and chlorine and discontinuing introduction of oxygen.

7. A method of chlorinating chromite ore containing at least about 10 percent chromium which comprises chlorinating a mixture of said ore and carbonaceous material at a temperature in excess of about 1250° C., in a nonheated reactor and introducing ore, chlorine and carbonaceous material into the reactor at a rate such that the heat evolved from the chlorination is sufficient to maintain the temperature of the reaction above 1250° C. without externally heating the reactor.

8. A method of chlorinating chromite ore containing at least about 10 percent chromium which comprises chlorinating a mixture of said ore and carbon at a temperature in excess of about 1400° C. in a nonheated reactor and introducing ore, chlorine and carbon into the reactor at a rate such that the heat evolved from the chlorination is sufficient to maintain the temperature of the reaction about 1400° C. without externally heating the reactor.

9. In a method of chlorinating a chromium bearing material containing at least about 10 percent of chromium which material normally sinters during chlorination thereof, the step which comprises minimizing sintering by chlorinating the material at a temperature in excess of about 1250° C. whereby metallic chlorides which normally cause sintering at lower temperatures are volatilized.

10. In a method of chlorinating chromite ore containing at least about 10 percent chromium which ore normally sinters during chlorination thereof the step which comprises minimizing sintering by chlorinating the ore at a temperature in excess of about 1250° C. whereby metallic chlorides which normally cause sintering at lower temperatures are volatilized.

11. A process of chlorinating chromite ore containing at least about 10 percent chromium which comprises chlorinating the said ore at a temperature sufficiently high to cause volatilization of metallic chlorides which tend to cause sintering at lower temperatures.

12. The process of claim 11 wherein the chlorination is conducted in the presence of a substantial quantity of oxygen in amount sufficient to substantially assist in minimizing sintering during chlorination.

13. The process of claim 7 wherein the chlorination is conducted in the presence of a substantial quantity of oxygen in amount sufficient to substantially assist in minimizing sintering during chlorination.

IRVING E. MUSKAT.